US008670217B1

(12) United States Patent
Braganca et al.

(10) Patent No.: US 8,670,217 B1
(45) Date of Patent: Mar. 11, 2014

(54) SCISSORING-TYPE CURRENT-PERPENDICULAR-TO-THE-PLANE (CPP) MAGNETORESISTIVE SENSOR WITH FREE LAYERS HAVING SHAPE ANISOTROPY

(71) Applicant: HGST Netherlands B.V., Amsterdam (NL)

(72) Inventors: Patrick Mesquita Braganca, San Jose, CA (US); Jeffrey R. Childress, San Jose, CA (US); Yang Li, San Jose, CA (US); Neil Smith, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/764,613

(22) Filed: Feb. 11, 2013

(51) Int. Cl.
*G11B 5/39* (2006.01)
(52) U.S. Cl.
USPC .................................. 360/324.12; 360/324.2
(58) Field of Classification Search
USPC ................ 360/324.1, 324.11, 324.12, 324.2, 360/327.11
See application file for complete search history.

(56) References Cited

U.S. PATENT DOCUMENTS

| | | | |
|---|---|---|---|
| 3,256,483 A | 6/1966 | Broadbent | |
| 5,737,156 A * | 4/1998 | Bonyhard | ................ 360/327.11 |
| 5,818,323 A | 10/1998 | Maeda et al. | |
| 6,510,031 B1 | 1/2003 | Gambino et al. | |
| 7,035,062 B1 | 4/2006 | Mao et al. | |
| 7,095,596 B2 | 8/2006 | Schmollngruber et al. | |
| 7,564,659 B2 | 7/2009 | Freitag et al. | |
| 7,672,090 B2 | 3/2010 | Carey et al. | |
| 7,848,065 B2 | 12/2010 | Freitag et al. | |
| 8,015,694 B2 * | 9/2011 | Carey et al. | ................ 29/603.16 |
| 8,310,792 B2 * | 11/2012 | Ohta et al. | ................ 360/324.12 |
| 2009/0207533 A1 * | 8/2009 | Shimazawa | ................ 360/324.1 |

OTHER PUBLICATIONS

Chow, et al., Aspect Ratio of Magnetoresistive Detector Stripes, IBM Technical Disclosure Bulletin, vol. 24, No. 3, p. 1481, Aug. 1981.

* cited by examiner

*Primary Examiner* — Jefferson Evans
(74) *Attorney, Agent, or Firm* — Thomas R. Berthold

(57) ABSTRACT

A scissoring-type CPP-MR sensor has the two free ferromagnetic layers formed as exchange-coupled structures. Each exchange-coupled structure includes a patterned layer formed of alternating stripes of ferromagnetic stripes and nonmagnetic stripes, and a continuous unpatterned ferromagnetic layer in contact with and exchange-coupled to the ferromagnetic stripes of the patterned layer. The ferromagnetic stripes have a length-to-width aspect ratio of at least 2, which results in increased uniaxial anisotropy of the exchange-coupled unpatterned ferromagnetic layer. The stripes are oriented at an acute angle relative to the disk-facing surface of the sensor, and the stripes of the first free layer are generally orthogonal to the stripes of the second free layers. A hard magnet layer is magnetized in a direction orthogonal to the disk-facing surface for biasing the magnetization directions of the unpatterned ferromagnetic layers in the first and second free layers generally orthogonal to one another.

18 Claims, 8 Drawing Sheets

SCISSORING-TYPE CURRENT-PERPENDICULAR-TO-THE-PLANE (CPP) MAGNETORESISTIVE SENSOR WITH FREE LAYERS HAVING SHAPE ANISOTROPY

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a scissoring-type CPP sensor with dual sensing or free layers.

2. Background of the Invention

One type of conventional MR sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP-MR sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-GMR read head the nonmagnetic spacer layer is formed of an electrically conductive material, typically a metal such as Cu or Ag. In a CPP-TMR read head the nonmagnetic spacer layer is formed of an electrically insulating material, such as $TiO_2$, MgO, or $Al_2O_3$.

A type of CPP sensor has been proposed that does not have a ferromagnetic reference layer with a fixed or pinned magnetization direction, but instead has dual ferromagnetic sensing or free layers separated by a nonmagnetic spacer layer. In the absence of an applied magnetic field, the magnetization directions or vectors of the two free layers are oriented generally orthogonal to one another with parallel magnetization components in the sensing direction of the magnetic field to be detected and antiparallel components in the orthogonal direction. With a sense current applied perpendicularly to the layers in the sensor stack and in the presence of an applied magnetic field in the sensing direction, the two magnetization vectors rotate in opposite directions, changing their angle relative to one another, which is detectable as a change in electrical resistance. Because of this type of behavior of the magnetization directions of the two free layers, this type of CPP sensor will be referred to herein as a "scissoring-type" of CPP sensor. If a CPP-GMR scissoring-type sensor is desired the nonmagnetic spacer layer is an electrically conducting metal or metal alloy. If a CPP-TMR scissoring-type sensor is desired the spacer layer is an electrically insulating material. In a scissoring-type CPP sensor, a single layer of hard magnetic material at the back of the sensor, opposite the air-bearing surface, is used to bias the magnetization directions so that they are roughly orthogonal to one another in the quiescent state, i.e., in the absence of an applied magnetic field. Without the hard bias layer, the magnetization directions of the two free layers would tend to be oriented antiparallel to one another. This tendency to be oriented antiparallel results from strong magnetostatic interaction between the two free layers once they have been patterned to sensor dimensions, but may also be the result of exchange coupling between the magnetic layers through the spacer. The scissoring-type of CPP sensor is described in U.S. Pat. No. 7,035,062 B2. Unlike in a conventional CPP GMR or TMR sensor, in a scissoring-type CPP sensor there is no need for an antiferromagnetic pinning layer. Accordingly, the read-gap and parasitic series electrical resistances are greatly reduced. This enables an enhanced down-track resolution and a stronger magnetoresistance signal.

In a scissoring-type CPP sensor, the detected signal field is aligned collinearly with the bias field from the hard bias layer above the sensor, rather than orthogonally as in the case of a conventional GMR spin-valve type sensor with two hard bias layers on each side. In situations where the signal field is antiparallel to the bias field, the total applied field on the scissoring-type sensor is reduced in magnitude, and it is more susceptible to magnetic instability (particular that originating at track edges) than a spin-valve type sensor where the total applied field on the sensor is never smaller than the hard bias field (which is strongest at the track edges). This generally makes the stabilization of the scissoring-type sensor more difficult compared to a spin-valve sensor.

One technique that addresses this stabilization problem is directional ion milling of either the free layers or the layers on which the free layers are subsequently deposited. This results in additional uniaxial anisotropy in the free layers. This technique is described in U.S. Pat. No. 8,015,694 B2 which is assigned to the same assignee as this application. However, with this technique it can be difficult to precisely define the anisotropy axes and to achieve uniformity over an entire wafer, from which a large number of sensors are fabricated.

What is needed is a scissoring-type CPP sensor with improved stability, where the magnetization directions of the two free layers are more easily maintained generally orthogonal to one another in the quiescent state as a result of uniaxial anisotropy induced other than by etching.

SUMMARY OF THE INVENTION

This invention relates to a scissoring-type CPP-MR sensor with free layers formed as exchange-coupled structures. Each exchange-coupled structure includes a patterned layer formed of alternating stripes of ferromagnetic stripes and nonmagnetic stripes, and a continuous unpatterned ferromagnetic layer in contact with and exchange-coupled to the ferromagnetic stripes of the patterned layer. The ferromagnetic stripes have a length-to-width aspect ratio of at least 2, which results in increased uniaxial anisotropy of the exchange-coupled unpatterned ferromagnetic layer. The unpatterned ferromagnetic layer in each free layer exchange-coupled structure is located adjacent the spacer layer. The stripes of the first free layer are preferably oriented at an acute angle in one direction relative to the disk-facing surface of the sensor and the stripes of the second free layer are preferably oriented at an acute angle in the other direction relative to the disk-facing surface of the sensor, so that the stripes of the first and second free layers are preferably the ferromagnetic stripes of the second free layer being oriented at an angle greater than or equal to 45 degrees and less than or equal to 135 degrees relative to the ferromagnetic stripes of the first free layer generally orthogonal. A hard magnet layer is recessed from the disk-facing surface of the sensor and is magnetized in a direction orthogonal to the disk-facing surface for biasing the magnetization directions of the unpatterned ferromagnetic layers in the first and second free layers generally orthogonal to one another.

For a fuller understanding of the nature and advantages of the present invention, reference should be made to the following detailed description taken together with the accompanying figures.

DETAILED DESCRIPTION OF THE INVENTION

Figure 1:
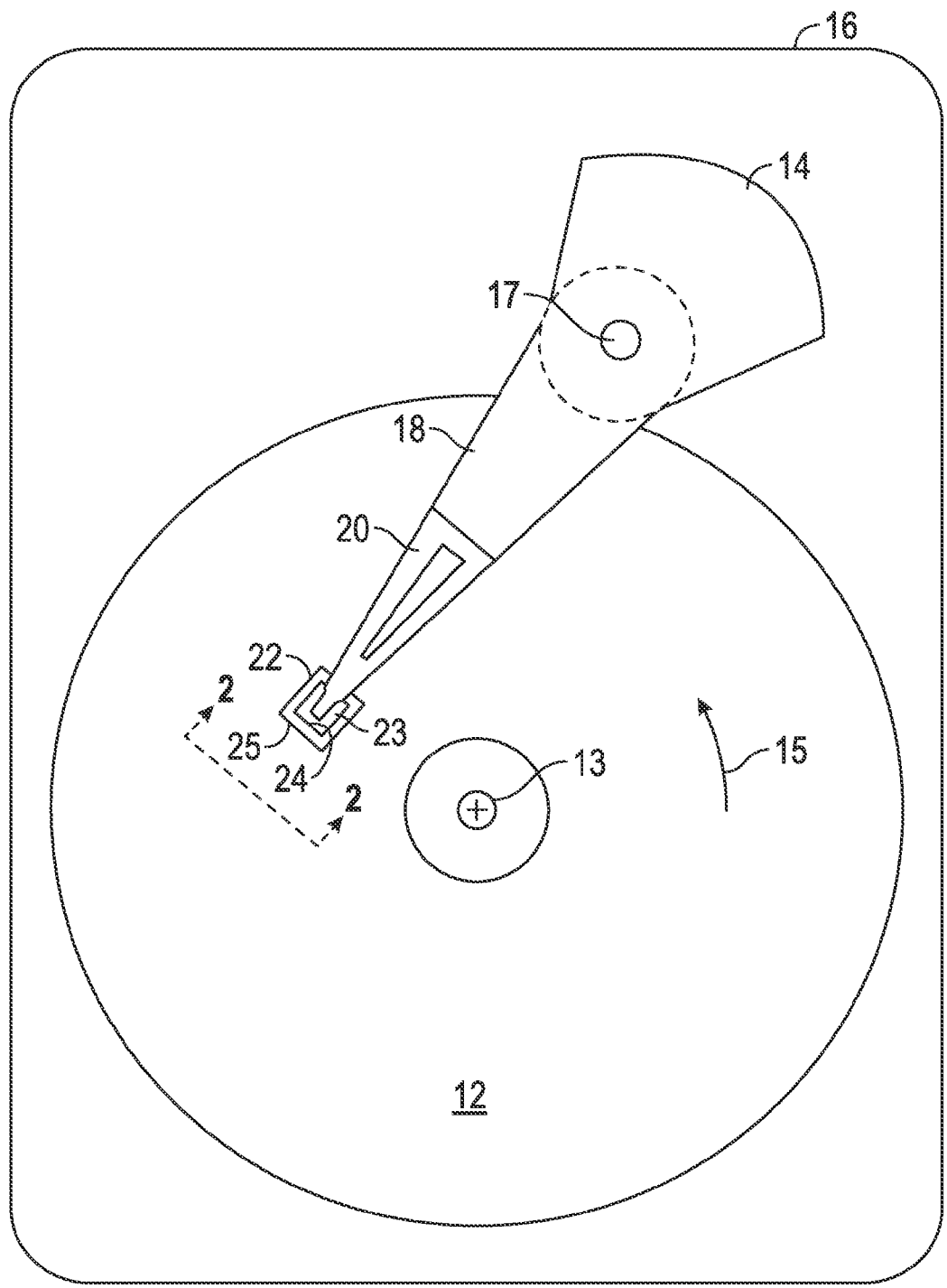
FIG. 1 is a schematic top view of a conventional magnetic recording hard disk drive with the cover removed.

The scissoring-type CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
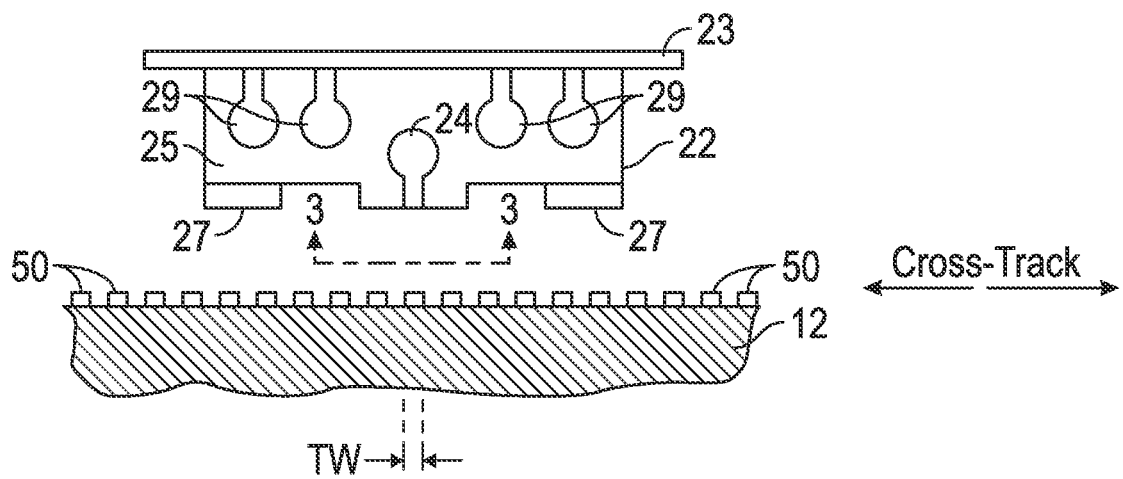
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
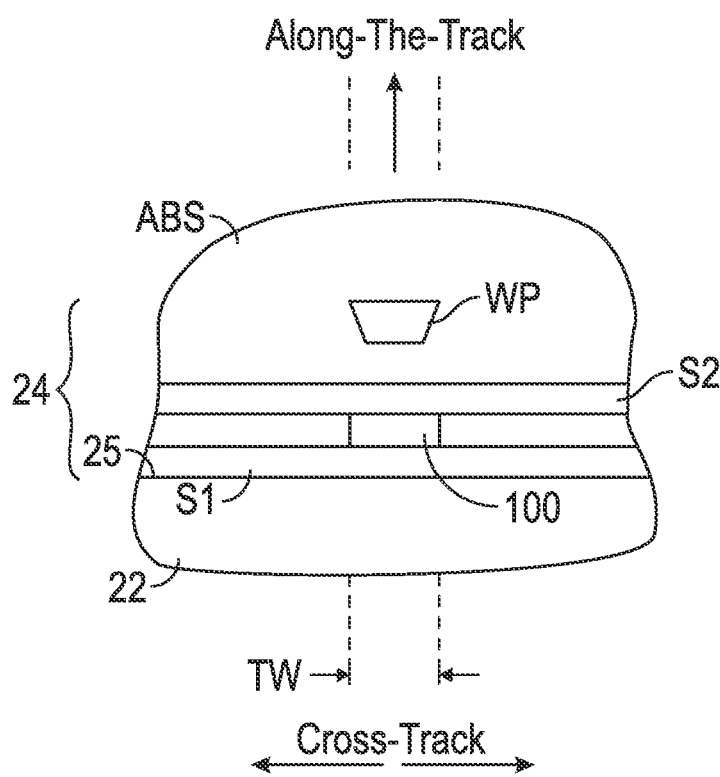
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The scissoring-type CPP MR sensor or read head 100 is located between two magnetic shields S1 and S2. The shields S1, S2 are formed of magnetically permeable material, typically a NiFe alloy, and may also be electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as ruthenium, tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4A:
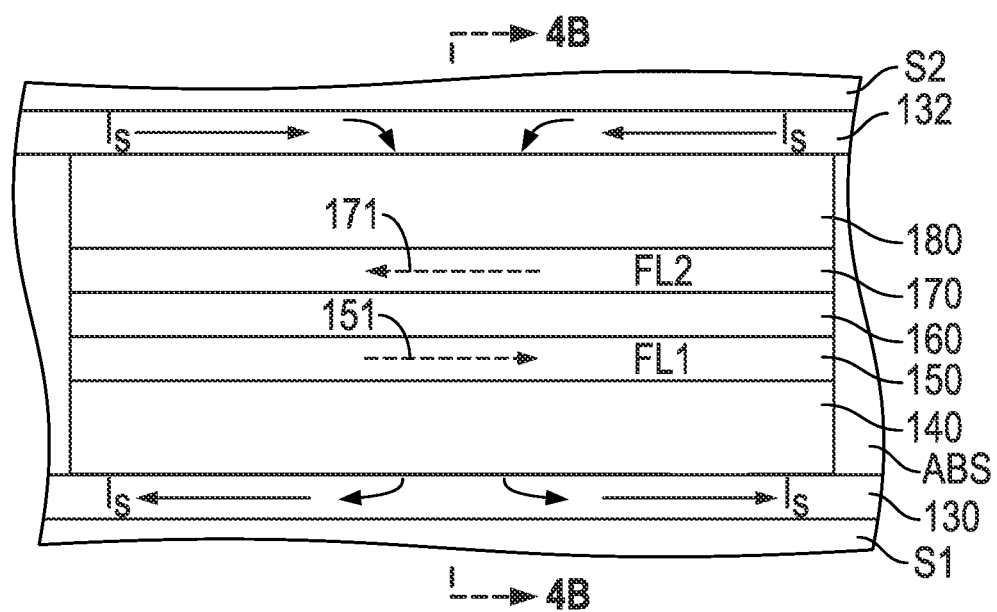
FIG. 4A is a cross-sectional schematic view facing the air-bearing surface (ABS) of the scissoring-mode CPP read head according to the prior art and showing the stack of layers located between the magnetic shield layers.

FIG. 4A is an enlarged sectional view facing the ABS of a prior art scissoring-type CPP GMR or TMR read head comprising a stack of layers, including dual sensing or free layers, formed between the two magnetic shield layers S1, S2. S1 and S2 are typically electroplated NiFe alloy films. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers are a first ferromagnetic free or sensing layer (FL1) 150 having a magnetic moment or magnetization direction 151 and a second ferromagnetic free or sensing layer (FL2) 170 having a magnetic moment or magnetization direction 171.

FL1 and FL2 are typically formed of conventional ferromagnetic materials like crystalline CoFe or NiFe alloys, or a multilayer of these materials, such as a CoFe/NiFe bilayer. Instead of these conventional ferromagnetic materials, FL1 and FL2 may be formed of or comprise a ferromagnetic Heusler alloy, some of which are known to exhibit high spin-polarization in their bulk form. Examples of Heusler alloys include but are not limited to the full Heusler alloys $Co_2MnX$ (where X is one or more of Al, Sb, Si, Sn, Ga, or Ge). Examples also include but are not limited to the half Heusler alloys NiMnSb, PtMnSb, and $Co_2FexCr_{(1-x)}Al$ (where x is between 0 and 1).

FL1 and FL2 comprise self-referenced free layers, and hence no pinned or pinning layers are required, unlike in conventional CPP spin-valve type sensors. FL1 and FL2 have their magnetization directions 151, 171, respectively, oriented in-plane and preferably generally orthogonal to one another in the absence of an applied magnetic field. While the magnetic moments 151, 171 in the quiescent state (the absence of an applied magnetic field) are preferably oriented generally orthogonal, i.e., between about 70 and 90 degrees to each other, they may be oriented by less than generally orthogonal, depending on the bias point at which the sensor 100 is operated. FL1 and FL2 are separated by a nonmagnetic spacer layer 160. Spacer layer 160 is a nonmagnetic electrically conductive metal or metal alloy, like Cu, Au, Ag, Ru, Rh, Cr and their alloys, if the sensor 100 is a CPP GMR sensor, and a nonmagnetic insulating material, like $TiO_2$, MgO or $Al_2O_3$, if the sensor 100 is a CPP TMR sensor.

Located between the lower shield layer S1 and the FL1 are the bottom electrical lead 130 and an underlayer or seed layer 140. The seed layer 140 may be a single layer or multiple layers of different materials. Located between FL2 and the upper shield layer S2 are a capping layer 180 and the top electrical lead 132. The leads 130, 132 are typically Ta or Rh, with lead 130 serving as the substrate for the sensor stack. However, a lower resistance material may also be used. They are optional and used to adjust the shield-to-shield spacing. If the leads 130 and 132 are not present, the bottom and top shields S1 and S2 are used as leads, with S1 then serving as the substrate for the deposition of the sensor stack. The underlayer or seed layer 140 is typically one or more layers of NiFeCr, NiFe, Ta, Cu or Ru. The capping layer 180 provides corrosion protection and is typically formed of single layers, like Ru or Ta, or multiple layers of different materials, such as a Cu/Ru/Ta trilayer.

In the presence of an external magnetic field in the range of interest, i.e., magnetic fields from recorded data on the disk 12, the magnetization directions 151 and 171 of FL1 and FL2, respectively, will rotate in opposite directions. Thus when a sense current $I_s$ is applied from top lead 132 perpendicularly through the stack to bottom lead 130, the magnetic fields from the recorded data on the disk will cause rotation of the magnetizations 151, 171 in opposite directions relative to one another, which is detectable as a change in electrical resistance.

Figure 4B:
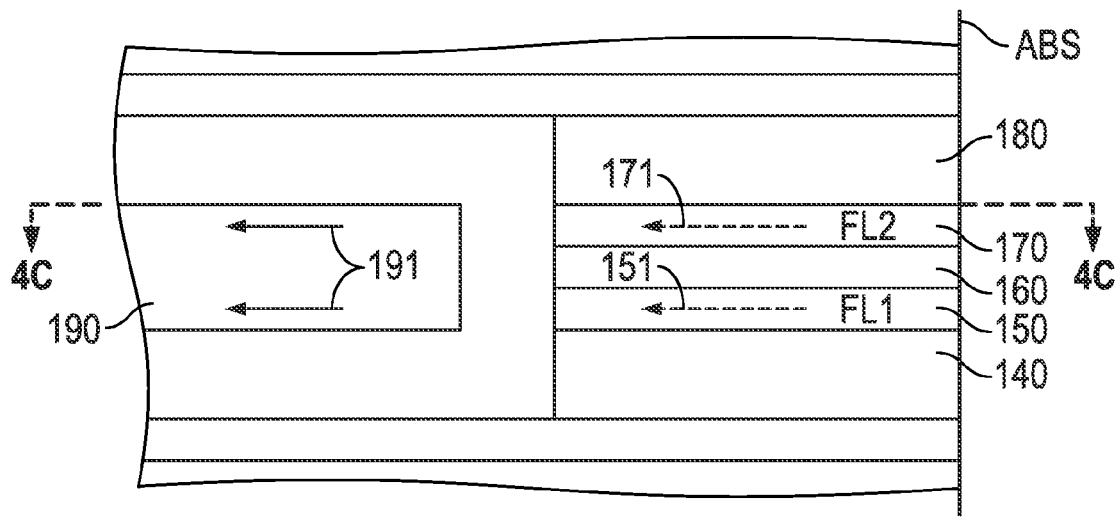
FIG. 4B is a view of section 4B-4B of FIG. 4A and shows the ABS in edge view and the hard biasing layer recessed from the ABS.
Figure 4C:
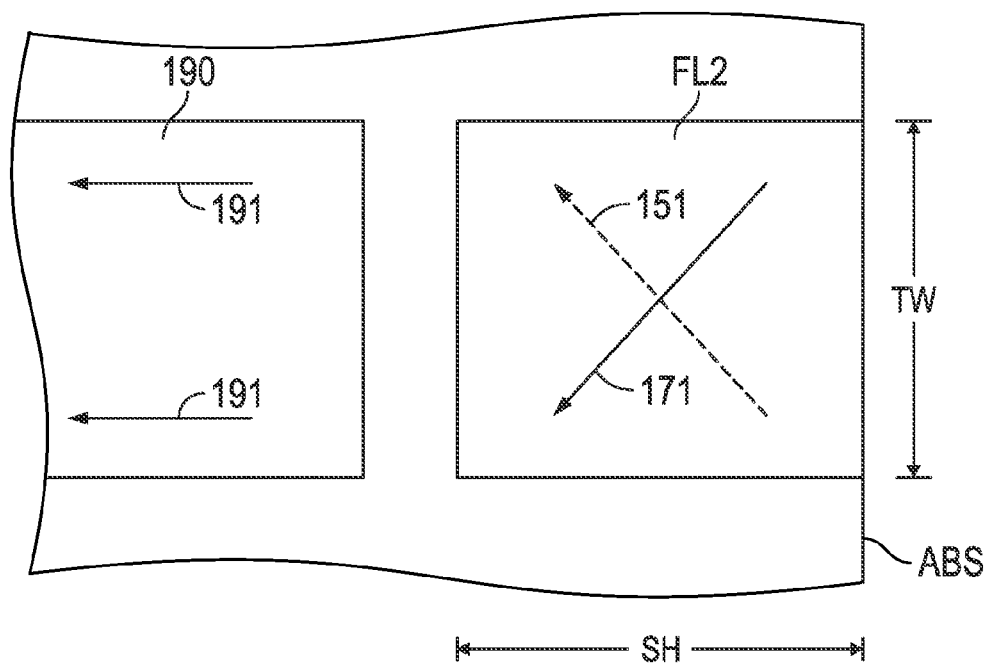
FIG. 4C is a view of section 4C-4C of FIG. 4B and shows the ABS in edge view and the hard biasing layer recessed from the ABS.

FIG. 4B is a sectional view along the plane 4B-4B in FIG. 4A and shows the ABS as a plane normal to the paper. FIG. 4C is a view along the plane 4C-4C in FIG. 4B with the ABS as a plane normal to the paper and shows the trackwidth (TW) and stripe height (SH) dimensions of the sensor. FIG. 4C shows the in-plane generally orthogonal relative orientation of magnetization directions 151, 171, with magnetization direction 151 being depicted as a dashed arrow because it is the magnetization direction of underlying FL1 which is not visible in FIG. 4C. As can be seen from FIG. 4C, in the absence of an applied magnetic field, the magnetization directions or vectors 151, 171 have parallel components in the sensing direction of the magnetic field to be detected (perpendicular to the ABS) and antiparallel components in the orthogonal direction (parallel to the ABS). FIGS. 4B and 4C show a hard bias layer 190 recessed from the ABS. The hard bias layer 190 is a hard magnet magnetized in-plane in the direction 191. Hard bias layer 190 stabilizes or biases the FL1, FL2 magnetization directions 151, 171 so they make a non-zero angle relative to one another, preferably a generally orthogonal relative orientation, by rotating them away from what would otherwise be an antiparallel orientation. Hard bias layer 190 may be formed of a CoPt or CoPt Cr alloy or other relatively high coercivity ferromagnetic material. Referring to FIG. 4C, the detected signal field is generally perpendicular to the ABS and is aligned generally collinearly with the bias field 191 from the hard bias layer 190. In situations where the signal field is antiparallel to the bias field 191, the total applied field on the sensor (FL1 and FL2) is reduced in magnitude, and thus the sensor can be susceptible to magnetic instability (particular that originating at track edges). In the present invention this can be alleviated to a significant degree by a strong shape-induced magnetic anisotropy in FL1 and FL2 (with an anisotropy field of about 100 Oe or greater) that favors generally orthogonal orientation of FL1 and FL2.

In this invention, FL1 and FL2 have shape-induced uniaxial magnetic anisotropy. Uniaxial magnetic anisotropy of a ferromagnetic layer imparts an energetic preference for the magnetization to align collinear to the anisotropy axis, referred to as the easy axis, which (at the bulk film level) is the lowest energy state. The shape-induced uniaxial anisotropy of FL1 and FL2 enables the relative orientation of the easy axes of this source of anisotropy to be chosen and maintained irrespective of the actual geometry of the sensor.

Figure 5:
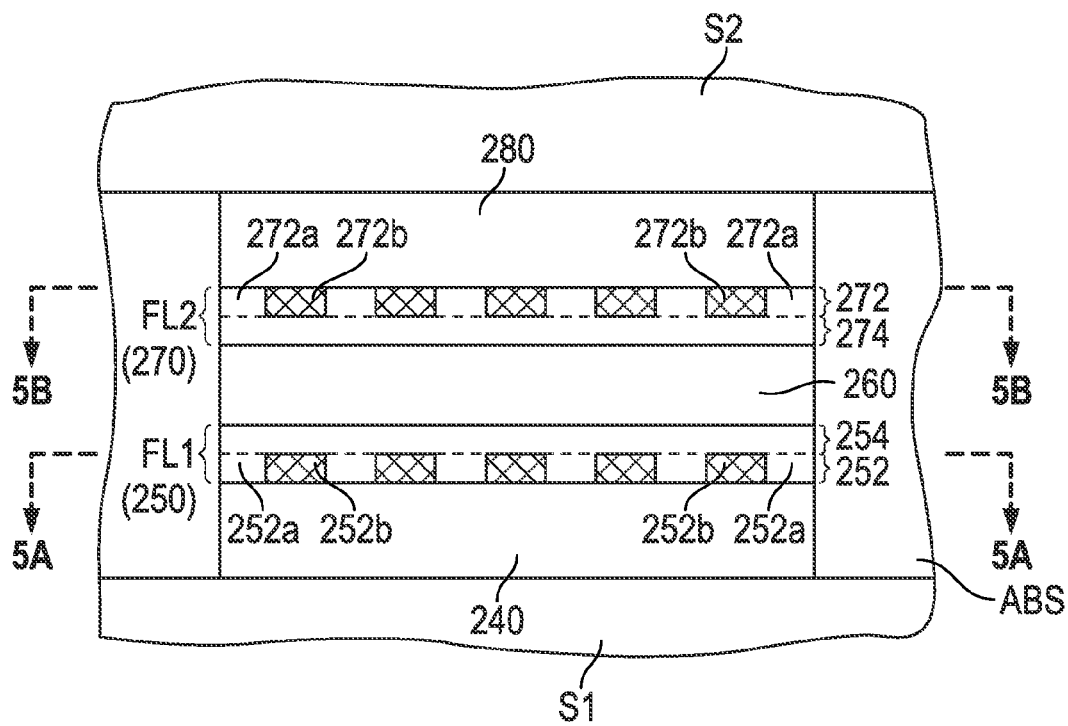
FIG. 5 is a view of the ABS of the scissoring-type CPP sensor according to the invention and illustrating the exchange-coupled free layers.

This invention is a scissoring-type CPP-MR sensor like that described and shown in FIGS. 4A-4C, but wherein each free layer FL1 and FL2 is an exchange-coupled structure. FIG. 5 shows the FL1 exchange-coupled structure 250 and the FL2 exchange-coupled structure 270 according to the invention with spacer layer 260 between FL1 250 and FL2 270. FL1 250 is formed on seed layer 240 which is formed on shield layer S1. Capping layer 280 is located above FL2 270 and below shield layer S2.

The FL1 exchange-coupled structure 250 comprises a patterned layer 252, formed of alternating stripes of ferromagnetic stripes 252a and nonmagnetic stripes 252b, and a continuous unpatterned ferromagnetic layer 254 in contact with and exchange-coupled to the ferromagnetic stripes 252a of the patterned layer 252. The FL2 exchange-coupled structure 270 comprises a patterned layer 272, formed of alternating stripes of ferromagnetic stripes 272a and nonmagnetic stripes 272b, and a continuous unpatterned ferromagnetic layer 274 in contact with and exchange-coupled to the ferromagnetic stripes 272a of the patterned layer 272. The unpatterned ferromagnetic layers 254, 274 of the exchange-coupled FL1 250, FL2 270, respectively, face the spacer layer 260.

Figure 5A:
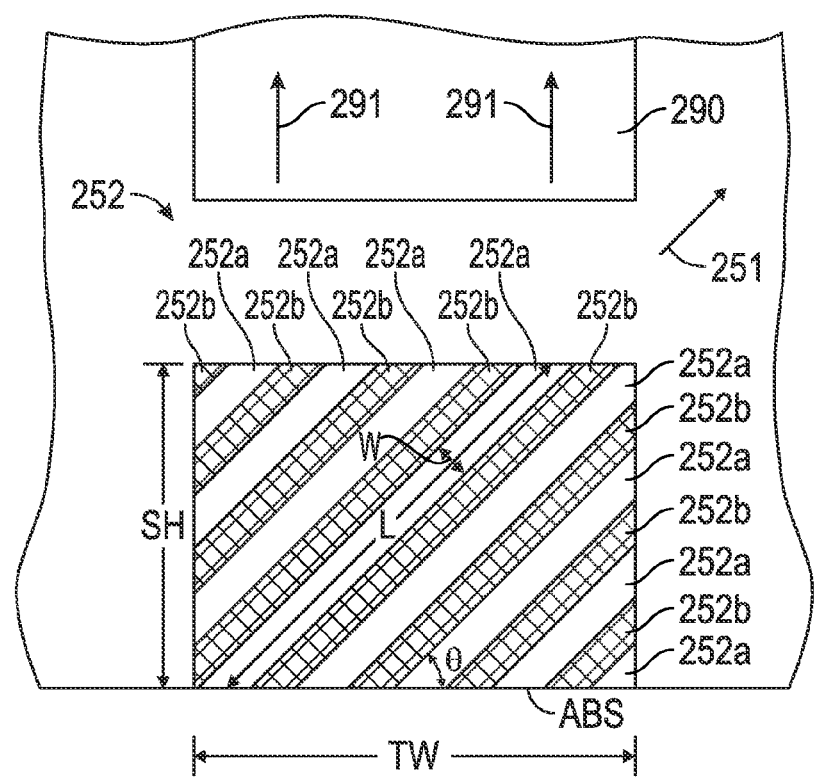
FIG. 5A is a view of section 5A-5A of FIG. 5 and depicts a top view of the patterned layer of the exchange-coupled first free layer according to the invention.
Figure 5B:
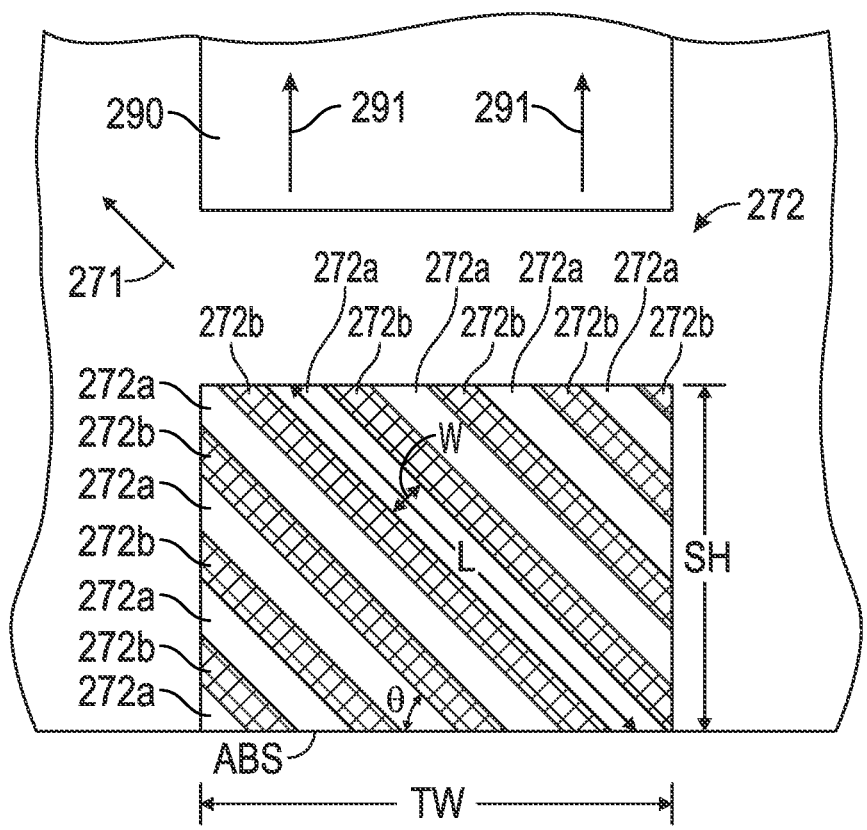
FIG. 5B is a view of section 5B-5B of FIG. 5 and depicts a top view of the patterned layer of the exchange-coupled second free layer according to the invention.

FIG. 5A is a view of section 5A-5A of FIG. 5 and depicts a top view of the patterned layer 252 of FL1 250. The alternating ferromagnetic stripes 252a and nonmagnetic stripes 252b are oriented at a acute angle θ, e.g., 45 degrees, relative to the ABS. FIG. 5B is a view of section 5B-5B of FIG. 5 and depicts a top view of the patterned layer 272 of FL1 270. The alternating ferromagnetic stripes 272a and nonmagnetic stripes 272b are oriented at a acute angle θ, e.g., 45 degrees, relative to the ABS, but in the opposite direction from the stripes of patterned layer 252. As a result, for the example where θ=45 degrees, the stripes 252a, 252b of FL1 250 are orthogonal to the stripes 272a, 272b of FL2 270 (the angle between ferromagnetic stripes 252a and 272a is equal to (180-20). As shown in FIGS. 5A, 5B, respectively, the ferromagnetic stripes 252a, 272a have a length L and a width W orthogonal to L, so as to have a relatively large aspect ratio (L/W). The aspect ratio (L/W) of the ferromagnetic stripes 252a, 272a is preferably at least 2, which is typically much larger than the MR sensor aspect ratio (SH/TW). For example, the sensor may have a TW of about 30 nm and a SH of about 35 nm. Then the exchange-coupled structures may have at least 2 ferromagnetic stripes each with a width W of about 10 nm, and a length L of about 50 nm (for θ=45 degrees) which would result in an aspect ratio of about 5 for a SH of 35 nm. This results in increased uniaxial anisotropy of the exchange-coupled ferromagnetic layers 254, 274, respectively, in a direction parallel to L due to shape anisotropy. The result is that the two unpatterned layers 254, 274 will have independently oriented shape-induced uniaxial magnetic anisotropy axes that help to stabilize the approximately orthogonal relative orientation of their respective magnetization directions or moments 251, 271. FIGS. 5A and 5B also show the hard bias layer 290 magnetized in direction 291 for biasing the magnetizations of unpatterned layers 254, 274 in directions 251, 271, respectively.

While the ferromagnetic stripes 252a, 272a are depicted as being oriented orthogonal (i.e., 90 degrees) to one another, they may have a generally orthogonal orientation, which as used herein means the angle may be greater than or equal to 70 degrees and less than or equal to 90 degrees. Alternatively, the ferromagnetic stripes 252a, 272a may be oriented in a configuration other than generally orthogonal to one another, depending on the bias point selected for the sensor, for example the angle may be greater than or equal to 45 degrees and less than or equal to 135 degrees. In one embodiment the ferromagnetic stripes 252a, 272a may be parallel to one another and to the ABS, but the hard bias layer 290 would bias the magnetization directions 251, 271 away from the ABS. This embodiment would likely result in a lower signal because the rotations of 251, 271 in response to magnetic fields from the disk would be stiffer.

Figure 6A:
FIGS. 6A-6F illustrate the steps in making the exchange-coupled structure of the invention.
Figure 6B:
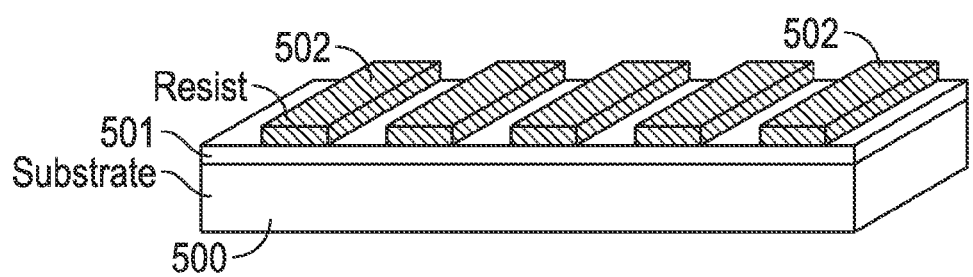
Figure 6C:
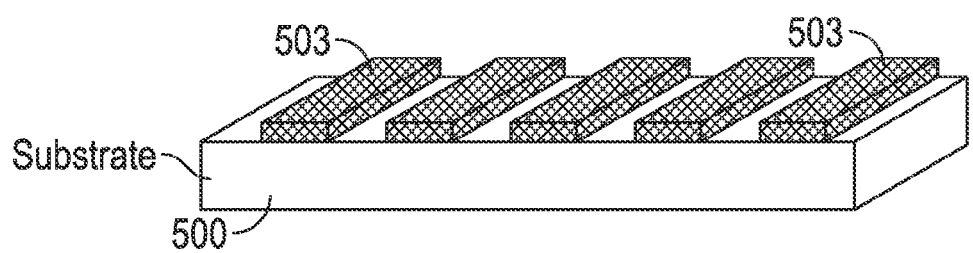
Figure 6D:
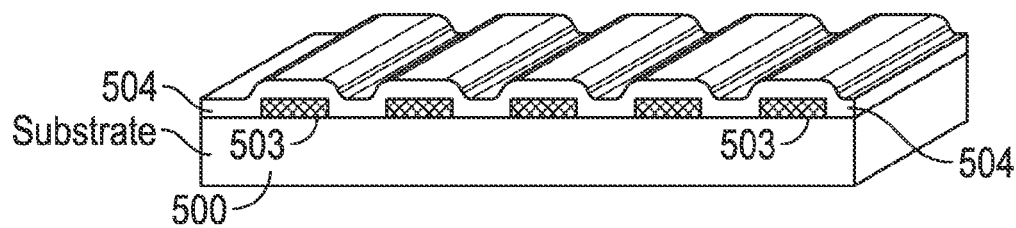
Figure 6E:
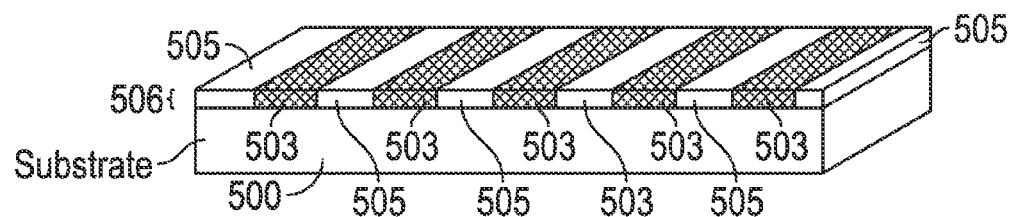
Figure 6F:
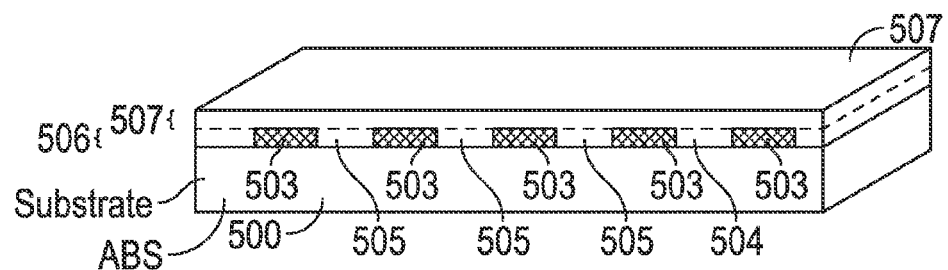

FIGS. 6A-6F illustrate the steps in making the exchange-coupled structure of this invention. In FIG. 6A, a continuous nonmagnetic layer 501 is deposited, such as by sputtering, onto a substrate 500. The substrate 500 may be, for example, suitable seed layer 240. The nonmagnetic layer 501 may be an oxide like an oxide of silicon, tantalum, or aluminum, a nitride of silicon, or nonmagnetic metals such as Cu, Cr, Ru, or Ta, and is deposited to a thickness between about 1 to 4 nm. Next, in FIG. 6B, a layer of resist is lithographically patterned into parallel stripes 502 on nonmagnetic layer 501. The resist stripes 502 are then used as a hard mask for etching, such as by wet etching, reactive ion etching (RIE), or ion milling, to transfer the resist pattern into the nonmagnetic layer 501. After removal of the resist stripes 501, a pattern of parallel nonmagnetic stripes 503 is formed on the substrate 500, as shown in FIG. 6C. Next, in FIG. 6D, ferromagnetic material 504 is deposited, such as by sputtering, over the structure of FIG. 6C to a thickness at least as thick as the nonmagnetic stripes 503. The ferromagnetic material may be any of the materials described above for use as the ferromagnetic reference layer. Then the structure of FIG. 6D is subjected to chemical-mechanical polishing (CMP) to remove the ferromagnetic material above the nonmagnetic stripes 503, resulting in the patterned layer 506 shown in FIG. 6E. The patterned layer 506 on substrate 500 is a pattern of alternating nonmagnetic stripes 503 and ferromagnetic stripes 505. Next a continuous unpatterned layer 507 of ferromagnetic material is deposited, such as by sputtering, on the structure of FIG. 6E. The material of ferromagnetic layer 507 is preferably the same as the material of layer 504 and is deposited to a thickness between about 1 to 4 nm. This results in the completed exchange-coupled structure shown in FIG. 6F with unpatterned ferromagnetic layer 507 on patterned layer 506 and exchange-coupled to the ferromagnetic stripes 505. In FIG. 8F, the exchange-coupled structure of layers 506, 507 may be, for example, layers 252, 254, respectively, of FL1 250 and substrate 500 may be seed layer 240.

Figure 7:
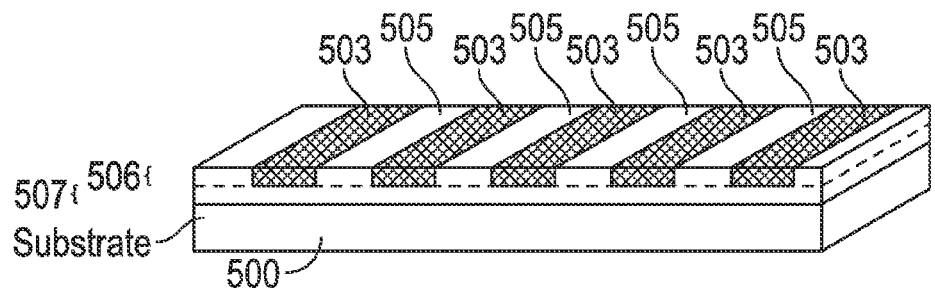
FIG. 7 illustrates an embodiment of the exchange-coupled structure according to the invention wherein the patterned layer is located above the unpatterned ferromagnetic layer.

FIG. 7 illustrates an embodiment of the exchange-coupled structure according to the invention wherein the patterned layer 506 is located above the unpatterned ferromagnetic layer 507. This structure can be made with minor changes to the above described process of FIGS. 6A-6E. A ferromagnetic layer 507 would be deposited on substrate 500 before the deposition of nonmagnetic layer 501 (FIG. 6A). The steps of FIGS. 6B-6E would then be performed, resulting in a structure similar to FIG. 6E, except that the previously deposited ferromagnetic layer 507 would now be located below patterned layer 506. This structure is shown in FIG. 7, wherein the exchange-coupled structure of layers 506, 507 may be, for example, layers 272, 274, respectively, of FL2 270 and substrate 500 may be spacer layer 260.

Figure 8:
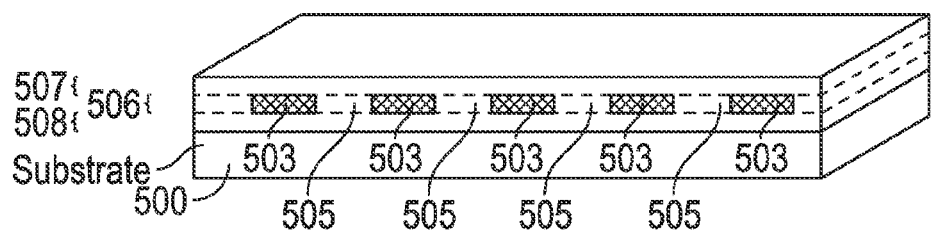
FIG. 8 illustrates an embodiment of the exchange-coupled structure according to the invention wherein there are two unpatterned ferromagnetic layers one, each unpatterned ferromagnetic layer being in contact with and exchange coupled to the ferromagnetic stripes of the patterned layer.

FIG. 8 illustrates an embodiment of the exchange-coupled structure according to the invention wherein the unpatterned ferromagnetic layer 507 of the exchange-coupled structure is a first unpatterned ferromagnetic layer, and a second unpatterned ferromagnetic layer 508 is in contact with and exchange-coupled to the ferromagnetic stripes 505 of the patterned layer 506. The patterned layer 506 is located between and in contact with the first and second unpatterned ferromagnetic layers 507 and 508, respectively. The embodiment of FIG. 8 may function as the exchange-coupled FL1 and FL2.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor capable of sensing external magnetic fields when a sense current is applied perpendicular to the planes of the layers in the sensor, the sensor comprising:
   a substrate;
   a first free layer on the substrate, the first free layer being an exchange-coupled structure comprising a patterned layer of alternating ferromagnetic stripes and nonmagnetic stripes and an unpatterned ferromagnetic layer in contact with and exchange-coupled to the ferromagnetic stripes of the patterned layer, the first free layer having an in-plane magnetization direction substantially free to rotate in the presence of an external magnetic field to be sensed;
   a nonmagnetic spacer layer on the first free layer; and
   a second free layer on the spacer layer, the second free layer being an exchange-coupled structure comprising a patterned layer of alternating ferromagnetic stripes and nonmagnetic stripes and an unpatterned ferromagnetic layer in contact with and exchange-coupled to the ferromagnetic stripes of the patterned layer, the second free layer having an in-plane magnetization direction substantially free to rotate in the presence of an external magnetic field to be sensed.

2. The sensor of claim 1 wherein the ferromagnetic stripes of the patterned layer of the first free layer and the ferromagnetic stripes of the patterned layer of the second free layer are generally parallel.

3. The sensor of claim 1 wherein the ferromagnetic stripes of the patterned layer of the first free layer and the ferromagnetic stripes of the patterned layer of the second free layer are generally orthogonal.

4. The sensor of claim 1 wherein the angle between the ferromagnetic stripes of the patterned layer of the first free layer and the ferromagnetic stripes of the patterned layer of the second free layer is greater than or equal to 45 degrees and less than or equal to 135 degrees.

5. The sensor of claim 1 further comprising a hard magnetic biasing layer for biasing the first and second free layers' magnetization directions to make a non-zero angle relative to one another.

6. The sensor of claim 1 wherein the patterned layer of the exchange-coupled structure of the first free layer is located between the substrate and the unpatterned ferromagnetic layer of the exchange-coupled structure of the first free layer.

7. The sensor of claim 1 wherein the unpatterned ferromagnetic layer of the exchange-coupled structure of the second free layer is located between the spacer layer and the patterned layer of the exchange-coupled structure of the second free layer.

8. The sensor of claim 1 wherein the unpatterned ferromagnetic layer of the exchange-coupled structure in at least one of said first and second free layers is a first unpatterned ferromagnetic layer, wherein the exchange-coupled structure in said at least one of said first and second free layers further comprises a second unpatterned ferromagnetic layer in contact with and exchange-coupled to the ferromagnetic stripes of the patterned layer, and wherein the patterned layer is located between and in contact with the first and second unpatterned ferromagnetic layers.

9. The sensor of claim 1 wherein the sensor is a current-perpendicular-to-the-plane (CPP) giant magnetoresistance (GMR) sensor and the nonmagnetic spacer layer is formed of an electrically conductive metal or metal alloy.

10. The sensor of claim 1 wherein the sensor is a current-perpendicular-to-the-plane (CPP) tunneling magnetoresistance (TMR) sensor and the nonmagnetic spacer layer is formed of an electrically insulating material.

11. The sensor of claim 1 wherein the sensor is a magnetoresistive read head for reading magnetically recorded data from tracks on a magnetic recording medium, and wherein the substrate is a first shield formed of magnetically permeable material.

12. A scissoring-type current-perpendicular-to-the-plane (CPP) magnetoresistive read head structure for reading magnetically recorded data from tracks on a magnetic recording disk in a disk drive, the head structure comprising:
   an air-bearing slider having an air-bearing surface (ABS) for facing the disk and a trailing surface generally orthogonal to the ABS;
   a first shield layer of magnetically permeable material on the slider's trailing surface;
   an underlayer on the first shield layer;
   a first free layer on the underlayer, the first free layer being an exchange-coupled structure comprising a patterned layer of alternating ferromagnetic stripes and nonmagnetic stripes and an unpatterned ferromagnetic layer in contact with and exchange-coupled to the ferromagnetic stripes of the patterned layer, the ferromagnetic stripes and nonmagnetic stripes being oriented at an acute angle relative to the ABS;
   a nonmagnetic spacer layer on the first free layer; and
   a second free layer on the substrate, the second free layer being an exchange-coupled structure comprising a patterned layer of alternating ferromagnetic stripes and nonmagnetic stripes and an unpatterned ferromagnetic layer in contact with and exchange-coupled to the ferromagnetic stripes of the patterned layer, the ferromagnetic stripes and nonmagnetic stripes being oriented at an acute angle relative to the ABS, the ferromagnetic stripes of the second free layer being oriented at an angle greater than or equal to 45 degrees and less than or equal to 135 degrees relative to the ferromagnetic stripes of the first free layer, said first and second free layers having respective magnetization directions free to rotate in opposite directions in the presence of a magnetic field from magnetically recorded data on the disk;
   a hard magnetic biasing layer recessed from the ABS for biasing the first and second free layers' magnetization directions to make a non-zero angle relative to one another;
   a capping layer on the second free layer; and
   a second shield of magnetically permeable material on the capping layer.

13. The structure of claim 12 wherein the unpatterned ferromagnetic layer in each of said first and second free layers is adjacent the spacer layer.

14. The structure of claim 12 wherein the unpatterned ferromagnetic layer of the exchange-coupled structure in at least one of said first and second free layers is a first unpatterned ferromagnetic layer, wherein the exchange-coupled structure in said at least one of said first and second free layers further comprises a second unpatterned ferromagnetic layer in contact with and exchange-coupled to the ferromagnetic stripes of the patterned layer, and wherein the patterned layer is located between and in contact with the first and second unpatterned ferromagnetic layers.

15. The structure of claim 12 wherein the ferromagnetic stripes of the second free layer are oriented at an angle greater than or equal to 70 degrees and less than or equal to 90 degrees relative to the ferromagnetic stripes of the first free layer.

16. The structure of claim 12 wherein the biasing layer biases the first and second free layers' magnetization directions generally orthogonal to one another.

17. The structure of claim 12 wherein the read head is a current-perpendicular-to-the-plane (CPP) giant magnetoresistance (GMR) read head and the nonmagnetic spacer layer is formed of an electrically conductive metal or metal alloy.

18. The structure of claim 12 wherein the read head is a current-perpendicular-to-the-plane (CPP) tunneling magnetoresistance (TMR) read head and the nonmagnetic spacer layer is formed of an electrically insulating material.

* * * * *